United States Patent [19]

Scholl

[11] Patent Number: 5,218,111

[45] Date of Patent: Jun. 8, 1993

[54] PROCESS FOR THE PRODUCTION OF POLYISOCYANATES CONTAINING URETDIONE AND ISOCYANURATE GROUPS

[75] Inventor: Hans-Joachim Scholl, Colonge, Fed. Rep. of Germany

[73] Assignee: Bayer Aktiengesellschaft, Bayerwerk, Fed. Rep. of Germany

[21] Appl. No.: 742,985

[22] Filed: Aug. 9, 1991

[30] Foreign Application Priority Data

Aug. 24, 1990 [DE] Fed. Rep. of Germany ....... 4026705

[51] Int. Cl.$^5$ .................. C07D 229/00; C08G 18/80
[52] U.S. Cl. ........................... 540/202; 528/45; 528/67
[58] Field of Search ............... 540/202; 528/45, 67

[56] References Cited

U.S. PATENT DOCUMENTS

| | | |
|---|---|---|
| 2,671,082 | 3/1954 | Stallmann ............................ 540/202 |
| 3,489,744 | 1/1970 | Schwarcz et al. .................. 540/202 |
| 3,919,195 | 11/1975 | Bakhitov et al. .................... 540/202 |
| 3,993,641 | 11/1976 | Tiemann et al. .................... 540/202 |
| 4,614,785 | 9/1986 | Richter et al. ....................... 528/45 |
| 4,837,321 | 6/1989 | Kerimis et al. ..................... 544/193 |
| 5,013,838 | 5/1991 | Scholl ................................. 544/193 |
| 5,043,092 | 8/1991 | Pedain et al. .................. 252/182.21 |

FOREIGN PATENT DOCUMENTS 3809261 9/1989 Fed. Rep. of Germany .
1153815 5/1969 United Kingdom .

OTHER PUBLICATIONS

Chemical Abstracts, vol. 100, No. 2, 1984, Ref. No. 7216s.

Primary Examiner—John M. Ford
Assistant Examiner—Y. N. Gupta
Attorney, Agent, or Firm—Joseph C. Gil; Thomas W. Roy

[57] ABSTRACT

The present invention relates to dimerization catalysts which are suitable for the dimerization of organic isocyanates by heterogeneous catalysis, wherein the catalysts contain tertiary phosphines adsorbed onto adsorbent, porous carrier materials having a particle size (90%) of 0.1 to 10 mm, a pore volume of 0.4 to 1.4 ml/g, an average pore diameter of 5 to 50 nm and a specific surface area (BET) of 100 to 700 m$^2$/g.

The present invention also relates to a process for the preparation of these catalysts by the adsorption of tertiary phosphines onto these carrier materials, optionally in the presence of inert solvents.

Finally, the present invention relates to the use of these catalysts for the preparation of polyisocyanates containing uretdione and isocyanurate groups by the dimerization and trimerization of a proportion of the isocyanate groups of organic diisocyanates.

2 Claims, No Drawings

PROCESS FOR THE PRODUCTION OF POLYISOCYANATES CONTAINING URETDIONE AND ISOCYANURATE GROUPS

BACKGROUND OF THE INVENTION

1. Field of the Invention

The present invention relates to new dimerization catalysts suitable for catalyzing reactions of organic isocyanates by heterogeneous catalysis, in particular as fixed bed catalysts, to a process for their preparation and to their use for the production of polyisocyanates containing uretdione and isocyanurate groups.

2. Description of the Prior Art

Catalysts for the dimerization of organic isocyanates are known (Alfred Hassner, Small Ring Heterocycles—Part 2, pages 522-526, John Wiley and Sons, New York, 1983). According to the teachings of DE-OS 34 32 081 (U.S. Pat. No. 4,614,785), tertiary phosphines are advantageously used.

These catalysts are generally used in a homogeneous phase, are often added in considerable quantities to the diisocyanates used as starting materials and must subsequently be inactivated.

The known processes for the preparation of dimerized diisocyanates (see e.g. DE-OS 16 70 720) are not optimally suitable for large scale commercial production. The main disadvantage of these processes is the need to use relatively large quantities of catalysts which require a correspondingly large quantity of inactivators such that the dimerized diisocyanates contain a relatively large proportion of unwanted foreign substances which have a deleterious effect on the properties of the polyurethanes produced from the diisocyanates.

According to the teachings of DE-OS 3 809 261, the quantity of catalyst may be reduced if the diisocyanate starting materials, e.g., hexamethylene diisocyanate (HDI) are free from carbon dioxide. Even when using the elaborate methods of purification, considerable quantities of homogeneous catalysts are still required which again necessitates correspondingly large quantities of inactivators.

It was therefore an object of the present invention to provide new dimerization catalysts for organic isocyanates which would be suitable for heterogeneous catalysis, in particular as fixed bed catalysts, so that the polyisocyanates having a uretdione and isocyanurate structure prepared from these catalysts can be worked up without adding the aforesaid inactivators after removal of the heterogeneous catalyst, preferably with the addition of small quantities of acid compounds as stabilizers.

This object has been achieved by providing the dimerization catalysts according to the invention described below.

SUMMARY OF THE INVENTION

The present invention relates to dimerization catalysts which are suitable for the dimerization of organic isocyanates by heterogeneous catalysis, wherein the catalysts contain tertiary phosphines adsorbed onto adsorbent, porous carrier materials having a particle size (90%) of 0.1 to 10 mm, a pore volume of 0.4 to 1.4 ml/g, an average pore diameter of 5 to 50 nm and a specific surface area (BET) of 100 to 700 $m^2/g$.

The present invention also relates to a process for the preparation of these catalysts by the adsorption of tertiary phosphines onto these carrier materials, optionally in the presence of inert solvents.

Finally, the present invention relates to the use of these catalysts for the preparation of polyisocyanates containing uretdione and isocyanurate groups by the dimerization and trimerization of a proportion of the isocyanate groups of organic diisocyanates.

DETAILED DESCRIPTION OF THE INVENTION

The carrier materials according to the invention are organic or inorganic, porous, spherical adsorbents which meet the requirements previously set forth. The adsorbents used as carrier materials preferably have a particle size (90%) of 0.2 to 5 mm, a pore volume of 0.6 to 1.2 ml/g, an average pore diameter of 7 to 30 nm and a specific surface area of from 110 to 600 $m^2/g$ Examples of suitable carrier materials include commercially available, spherical carrier materials which meet these requirements and substantially based on silicon dioxide such as those available from Grace GmbH, D 6520 Worms, under the name of "GRACE Bead Type Silica Catalyst Supports C 10 and C 15" and spherical adsorbents based on polymeric divinylbenzene and available from Bayer AG, Leverkusen under the name of LEWATIT VP OC 1062.

The phosphines used for the preparation of the carrier catalysts according to the invention may be any tertiary phosphines, e.g., those described in U.S. Pat. No. 4,614,785, (herein incorporated by reference) at column 4, lines 11 to 47. For example, trialkylphosphines having a total of 12 to 24 carbon atoms are suitable such as tri-n-butylphosphine or tri-n-octylphosphine. Tri-n-butylphosphine is preferred as modifying catalyst.

The "adsorption" of the tertiary phosphine on the porous carrier material is preferably carried out with the aid of low boiling solvents such as methanol, ethanol, isopropanol or diisopropylether. The carrier material is taken up in the solvent (about 2 to 3 times the quantity by weight of solvent), the tertiary phosphine is then added with stirring and under a protective gas and the low boiling solvent is subsequently drawn off under vacuum.

The quantities of tertiary phosphine and support material are generally calculated to result in carrier catalysts according to the invention which have a phosphine content of 0.02 to 2 mmol, preferably 0.05 to 0.6 mmol of phosphine per g of carrier material.

The dimerization catalysts obtained by this method are eminently suitable for heterogeneous catalysis, i.e. in particular as fixed bed catalysts, for the catalytic preparation of polyisocyanates containing uretdione and isocyanurate groups from monomeric organic diisocyanates, in particular those having aliphatically or cycloaliphatically bound isocyanate groups.

The diisocyanates used as starting materials for the catalytic oligomerization reaction include aliphatic or cycloaliphatic diisocyanates having a molecular weight above 139, preferably 140 to 250. Examples include tetramethylene diisocyanate, hexamethylene diisocyanate (HDI), dodecamethylene diisocyanate, cyclobutane-1,3-diisocyanate, cyclohexane-1,3- and 1,4-diisocyanate, 1-isocyanato-3,3,5-trimethyl-5-isocyanato-methyl-cyclohexane (IPDI), perhydro-2,4- and/or 2,6-diisocyanatotoluene, perhydro-2,4'- and/or -4,4'-diisocyanatodiphenylmethane and mixtures of these diisocyanates. HDI is a particularly preferred starting diisocyanate.

The catalysts according to the invention may be used in various ways for the preparation of polyisocyanates containing uretdione and isocyanurate groups. In one embodiment the catalysts according to the invention may be added to the starting diisocyanate which is to undergo the dimerization and trimerization reaction and may then be removed from the reaction mixture by filtration when the desired degree of oligomerization has been reached. In another embodiment the catalysts according to the invention are eminently suitable as fixed bed catalysts for a process in which the starting diisocyanates which are to be subjected to oligomerization are passed, for example, through a reaction column filled with the catalyst and heated to the reaction temperature.

When the catalyst is used in accordance with one of these embodiments, the quantity of catalyst required depends upon the purity of the organic starting diisocyanate. The quantity of catalyst required is therefore most easily determined by a preliminary experiment. When the heterogeneous catalyst is added to the starting diisocyanate which is to be oligomerized, the quantity of catalyst generally corresponds to 0.1 to 5 mmol of phosphine per mole of starting diisocyanate, but larger quantities may also be used since the reaction may be terminated at any time by removal of the catalyst by filtration and stabilization with acidic additives.

It is frequently advantageous to support the catalytic action of the catalysts according to the invention by a small quantity of urethane groups which act as co-catalysts. Such co-catalysis may be carried out, for example, by the addition of a small quantity of an alcohol (for example, 0.01 to 1% by weight, based on the weight of the starting diisocyanate used). The alcohols added immediately react with the excess of starting diisocyanate present to form urethane groups. Methanol, ethanol, ethylene glycol and 2-ethylhexane-1,3-diol are examples of suitable potential co-catalysts of this type. The alcohols may be added at the same time or before the main catalyst.

According to a preferred embodiment of the preparation of polyisocyanates containing uretdione and isocyanurate groups with the aid of the catalysts according to the invention, any acid impurities which are present in the starting diisocyanates and prevent spontaneous oligomerization and would in time inactivate the catalysts according to the invention are first "neutralized" by the addition of a small quantity of a component which is basic in reaction. This enables the dimerization and trimerization reaction to begin and proceed spontaneously under the usual reaction conditions when the catalyst is added to the starting diisocyanate. The quantity of such "neutralization additives" can easily be determined by a preliminary experiment. Tertiary phosphines such as those adsorbed by support materials according to the invention may advantageously be used as the "neutralizing agents" so that no foreign substances need to be added to the reaction mixture.

The dimerization and trimerization reaction, which preferably proceeds in an inert gas atmosphere, is preferably carried out solvent-free within temperature range of 0° to 100° C., more preferably 20° to 80° C. The reaction may also be carried out in the presence of inert solvents, e.g., hydrocarbons such as toluene or xylene and esters such as butyl acetate.

The reaction is generally terminated when a degree of oligomerization of 5 to 40% is reached, preferably 10 to 30%. This corresponds to product yields of about 10 to 80% by weight, preferably 20 to 60% by weight. By "degree of oligomerization" is meant the percentage of isocyanate groups which undergo dimerization or trimerization during the reaction. When HDI is used, which is the preferred starting diisocyanate, the aforesaid degree of oligomerization corresponds to an NCO content in the reaction mixture of 30 to 47.5% by weight, preferably from 35 to 45% by weight. The degree of oligomerization can be followed during the reaction, for example by continuous determination of the refractive index or the isocyanate content of the reaction mixture.

The oligomerization reaction generally results in dimerization products (uretdiones) of the diisocyanates used as starting material, together with minor quantities of trimers (isocyanurates). Since, however, the latter are present in a less than an equivalent molar quantity, the catalysts according to the invention have been referred to as "dimerization catalysts" for simplicity.

In heterogeneous catalysis, termination of the oligomerization reaction is brought about by removal of the heterogeneous catalyst, as previously mentioned.

The polyisocyanates having uretdione and isocyanurate groups which are obtained are preferably stabilized by the addition of small amounts of acidic additives which destroy the above-mentioned spontaneous oligomerization which was previously established by the neutralization of acid impurities. The addition of acidic substances in quantities of from 0,05 mmol to 1,0 mmol per mole of isocyanate groups is entirely sufficient for this purpose. Suitable stabilizers include any organic acids, e.g., sulphonic acids such as benzene or toluene sulphonic acid or acid esters of phosphoric acid such as dibutylphosphate or di-(2-ethylhexyl)-phosphate. Such acid additives may also be fixed on support materials and used in this form (for example, Sicapent of Merck AG, Darmstadt, consisting substantially of phosphorus pentoxide fixed on silica gel). The solid is removed after the treatment.

The polyisocyanates containing uretdione and isocyanurate groups may be freed from volatile constituents such as excess starting diisocyanate and auxiliary solvents, if used, in known manner. High quality, substantially monomer-free lacquer polyisocyanates containing uretdione and isocyanurate groups and having aliphatically and/or cycloaliphatically bound isocyanate groups are obtained by these means. The polyisocyanates may, if desired, be used in blocked form by a reaction with blocking agents for isocyanate groups to produce high quality polyurethane lacquers, in particular two-component polyurethane lacquers.

All the percentages given in the following examples are percentages by weight unless otherwise indicated.

EXAMPLES

Starting Materials

Phosphines:

Tri-n-butylphosphine and tri-n-octylphosphine were used in the examples given below.

Adsorbent I:

Commercial spherical catalyst carrier based on silicon dioxide and having a particle size (90%) of about 2 to 3 mm, a pore volume of 1.05 ml/g, a pore diameter of 15 nm and a specific surface area of about 185 m²/g (GRACE Bead Type Silica Catalyst Support C 15, Manufacturer: GRACE GmbH, D 6520 Worms).

Adsorbent II:

Commercial spherical catalyst carrier based on silicone dioxide and having a particle size (90%) of about 2 to 3 mm, a pore volume of 1.05 ml/g, a pore diameter of 10 nm and a specific surface area of about 280 m$^2$/g (GRACE Bead Type Silica Catalyst Support C 10).

Adsorbent III:

Commercial spherical catalyst carrier based on a divinylbenzene polymer having a particle size (90%) of 0.2 to 0.8 mm, a pore volume of about 0.6 to 0.65 ml/g, a pore diameter of 11 nm and a specific surface area of about 500 to 600 m$^2$/g (LEWATIT VP OC 1062 of Bayer AG, Leverkusen).

EXAMPLE 1A

Preparation of a Heterogeneous Catalyst 40 g of Adsorbent I were taken up in 100 ml of methanol. 1.8 g of tri-n-butylphosphine were introduced dropwise with stirring under nitrogen at room temperature and methanol was subsequently removed under vacuum (30° C./30 mbar). A loose, pourable heterogeneous catalyst according to the invention having a phosphine content of 0.2 mmol of phosphine/g was obtained.

EXAMPLE 1B

Preparation of a Heterogeneous Catalyst

Example 1a was repeated using 4,5 g of tri-n-butylphosphine. A pourable heterogeneous catalyst according to the invention having a phosphine content of 0.5 mmol of phosphine/g was obtained.

EXAMPLE 2

Preparation of a Heterogeneous Catalyst

Example 1a was repeated using 270 g of Adsorbent II, 300 g of ethanol and 30 g of tri-n-butylphosphine. A pourable heterogeneous catalyst according to the invention having a phosphine content of 0.5 mmol of phosphine/g was again obtained.

EXAMPLE 3

Preparation of a Heterogeneous Catalyst

Example 1a was repeated using 60 g of Adsorbent III, 100 g of isopropanol and 12 g of tri-n-octylphosphine. A pourable heterogeneous catalyst according to the invention having a phosphine content of 0.4 mmol of phosphine/g was obtained.

EXAMPLE 4

Use According to the Invention 840 g (5 moles) of HDI were heated to 55° C. under a nitrogen atmosphere with stirring and 0.1 g of tri-n-butylphosphphine and the total quantity (41,8 g) of the freshly prepared heterogeneous catalyst from Example 1a were added. The reaction mixture was then stirred at 54° to 56° C. and the progress of the reaction was by the increasing refractive indices. After 5 hours at 54° to 56° C., a refractive index (23° C.) of 1.4610 was obtained (initial value: 1.4522). The catalyst was removed by filtration and the filtrate was stabilized by the addition of 1.5 g of dibutylphosphate. The product was then freed from excess HDI down to a residue of 0.2% by thin layer distillation at 160° C./0.1 mbar. A clear, almost colorless polyisocyanate containing uretdione and isocyanurate groups and having an isocyanate content of 22.7% and a viscosity (23° C.) of 110 mPa.s was obtained. The yield, based on the HDI originally put into the process, was 24%.

Free HDI content: 0.2%
Composition according to $^{13}$C-NMR (mole %):
Uretdione: 80
Isocyanurate: 20

EXAMPLE 4A

Reuse of Catalyst and Thin Layered HDI from Example 4

The heterogeneous catalyst from Example 4 was reacted with 278 g (1.7 moles) of fresh HDI and 562 g (3.3 moles) of thin layered HDI from Example 4. A refractive index (23° C.) of 1.4594 was obtained after 16 hours at 23° to 26° C. When the product was worked up as in Example 4, a colorless product having the following data was obtained:

Yield: 20%
NCO content: 23.4%
Viscosity (23° C.): 120 mPa.s
Free HDI content: 0.3%
Uretdione: 71 mole %
Isocyanurate: 29 mole %.

EXAMPLE 5

Use According to the Invention 840 g (5 moles) of HDI were heated to 60° C. with stirring under nitrogen and 2 g of 2-ethylhexanediol-(1,3), 0.4 g of tri-n-butylphosphine and 20 g of the heterogeneous catalyst from Example 2 were added. A refractive index (23° C.) of 1.4622 was obtained after 4 hours at 60° C. Working up the product as in Example 4 yielded an almost colorless product having the following data:

Yield: 27.5%
Free HDI: 0.2%
NCO content: 22.2%
Viscosity (23° C.): 130 mPa.s
Uretdione: 88 mole %
Isocyanurate 12 mole %

EXAMPLE 6

Use According to the Invention

Example 5 was repeated. A refractive index (23° C.) of 1.4683 was obtained after 7.5 hours. Working up as in Example 4 yielded an almost colorless product having the following data:

Yield: 41.4%
Free HDI: 0.1%
NCO content: 21.4%
Viscosity (23° C.): 170 mPa.s
Uretdione: 84 mole %
Isocyanurate: 16 mole %

EXAMPLE 7

Use According to the Invention

Example 5 was repeated with the exception that the heterogeneous catalyst from Example 2 was replaced by 20 g of the heterogeneous catalyst from Example 3. A refractive index (23° C.) of 1.4654 was obtained after 6 hours. Working up according to Example 4 yielded an almost colorless product having the following data:

Yield: 36.4%
Free HDI: 0.2%
NCO content: 21.9%

Viscosity (23° C.): 160 mPa.s
Uretdione: 85 mole %
Isocyanurate: 15 mole %

EXAMPLE 8

1008 g (6 moles) of HDI were heated to 60° C. with stirring under nitrogen and 23 g of the heterogeneous catalyst from Example 1b were added. A refractive index (23° C.) of 1.4635 was obtained after 5 hours at 60° C. Working up with 2 g of dibutylphosphate as in Example 4 yielded an almost colorless product having the following data:

Yield: 29%
Free HDI: 0.2%
NCO content: 22.4%
Viscosity (23° C.): 130 mPa.s
Uretdione: 78 mole %
Isocyanurate: 22 mole %.

EXAMPLE 8A

Reuse of Catalyst and Recovered HDI from Example 8

The heterogeneous catalyst from Example 8 was reacted at 60° C. with 638 g (3.8 moles) of fresh HDI and 370 g (2.2 moles) of recovered HDI. A refractive index (23° C.) of 1.4700 was obtained after 8 hours at 60° C. Working up as in Example 4 provided the following results:

Yield: 43.1%
Free HDI: 0.2%
NCO content: 22.2%
Viscosity (23° C.): 240 mPa.s
Uretdione: 74 mole %
Isocyanurate: 26 mole %

EXAMPLE 8B

Reuse of Catalyst and Recovered HDI from Example 8a

The heterogeneous catalyst from Example 8a was reacted at 23° to 26° C. with 504 g (3 moles) of fresh HDI and 504 g of recovered HDI. A refractive index (23° C.) of 1.4655 was obtained after 18 hours at 23° to 26° C. The catalyst was then removed and the product was stirred with 7.5 g of an acid additive (Sicapent, available from Merck) for 40 minutes. The acid additive was filtered off and the product was thin-layered as in Example 4. An almost colourless product having the following data was obtained:

Yield: 32%
Free HDI: 0.3%
NCO content: 22.1%
Viscosity (23° C.): 190 mPa.s
Uretdione: 70 mole %
Isocyanurate: 30 mole %

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of polyisocyanates containing uretdione and isocyanurate groups by oligomerizing a portion of the isocyanate groups of a starting diisocyanate having aliphatically and/or cycloaliphatically bound isocyanate groups in the presence of a dimerization catalyst, the improvement wherein the dimerization catalyst comprises a tertiary phosphine adsorbed on an adsorbent, porous carrier material having a particle size (90%) of 0.1 to 10 mm, a pore volume of 0.4 to 1.4 ml/g, an average pore diameter of 5 to 50 nm and a specific surface area (BET) of 100 to 700 $m^2/g$.

2. The process of claim 1 wherein said tertiary phosphine comprises a trialkylphosphine having a total of 12 to 24 carbon atoms.

* * * * *